United States Patent
Queru (10) Patent No.: US 8,904,305 B2
(45) Date of Patent: Dec. 2, 2014

(54) AUTOMATICALLY HIDING CONTROLS

(75) Inventor: Jean Baptiste Maurice Queru, Foster City, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/216,466

(22) Filed: Aug. 24, 2011

(65) Prior Publication Data

US 2012/0304111 A1 Nov. 29, 2012

Related U.S. Application Data

(60) Provisional application No. 61/451,879, filed on Mar. 11, 2011.

(51) Int. Cl.
*G06F 3/048* (2013.01)
*G06F 3/0488* (2013.01)
*G06F 3/0481* (2013.01)
*G06F 3/0482* (2013.01)

(52) U.S. Cl.
CPC .......... *G06F 3/0488* (2013.01); *G06F 3/04886* (2013.01); *G06F 3/0481* (2013.01); *G06F 2203/04108* (2013.01); *G06F 3/0482* (2013.01)
USPC ........................................ 715/784; 715/788

(58) Field of Classification Search
CPC ..................................................... G06F 3/048
USPC ....................................................... 715/784
See application file for complete search history.

(56) References Cited

U.S. PATENT DOCUMENTS

| 5,910,802 A | 6/1999 | Shields et al. |
| 2005/0183017 A1 | 8/2005 | Cain |
| 2006/0107226 A1 | 5/2006 | Matthews et al. |
| 2008/0238938 A1 * | 10/2008 | Eklund et al. ................. 345/629 |
| 2009/0325607 A1 * | 12/2009 | Conway et al. ............ 455/456.3 |
| 2011/0148789 A1 * | 6/2011 | Kim et al. ..................... 345/173 |
| 2011/0283227 A1 * | 11/2011 | Moore et al. ................. 715/800 |

OTHER PUBLICATIONS

Wayne Pan, "JavaScript Pull to Refresh," Jul. 2010, http://waynepan.com/2010/07/30/javascript-pull-to-refresh/.
Product Feature Tour, Visual Studio Style, Auto Hide Control Bars, Mar. 9, 2004, 2 pages, http://www.bcgsoft.com/featuretour/tour156.htm.
Doing it Right: skipping the iPhone url bar, Aug. 5, 2010, 4 pages, http://remysharp.com/2010/08/05/doing-it-right-skipping-the-iphone-url-bar/.
Auto-Hide the Taskbar in Windows XP, Apr. 12, 2006, 3 pages, http://www.xp-tips.com/auto-hide-taskbar.html.
Office Action issued on Nov. 25, 2011 in U.S. Appl. No. 13/249,648, 18 pages.
Pogue, David, "iPhone: The Missing Manual, Fourth Edition." Aug. 2010, 7 pages.

* cited by examiner

*Primary Examiner* — Alvin Tan
*Assistant Examiner* — Xuyang Xia
(74) *Attorney, Agent, or Firm* — Troutman Sanders LLP; James E. Schutz; Jay R. Anderson (57) ABSTRACT

Methods, systems, and apparatus, including computer programs encoded on a computer storage medium, for automatically hiding controls. In one aspect, a method includes displaying at least a portion of a content region of a user interface and at least a portion of a control region of the user interface, wherein the control region is peripheral to the content region; and determining that the portion of the control region of the user interface has been displayed for a predetermined period of time, then automatically removing the portion of the control region from display.

11 Claims, 5 Drawing Sheets

AUTOMATICALLY HIDING CONTROLS

CROSS-REFERENCE TO RELATED APPLICATION

This application claims the benefit of U.S. Pat. App. No. 61/451,879, filed Mar. 11, 2011, which is incorporated herein by reference.

BACKGROUND

User interfaces may include content regions that display content, and control regions that display controls. For example, an email application may have a user interface that includes a content region that displays the content of an email, as well as a control region that includes reply, forward, and delete buttons. A web browser may display the content of a web page in a content region, and may display, in a control region, a navigation bar for allowing the user to navigate web pages or to determine information about a particular web page.

Applications typically display controls adjacent to content. When a user interface includes a large number of controls, the display of one or more control regions may overwhelm the small screen of a mobile device. To overcome this problem, traditional mobile device applications require the user of the mobile device to interact with the mobile device application before controls are shown. This approach, however, requires the user to be aware that the control region exists. Furthermore, once the control region is displayed, the small screen of a mobile device may become, and may remain, similarly overwhelmed.

SUMMARY

According to one general implementation, a control window or region, such as a region of a user interface that includes a toolbar, is displayed for a limited amount of time, then is automatically hidden to allow a larger portion of a content region to be displayed. By initially displaying the control region, the user is made aware of the existence of the controls, while eventually allowing a greater portion of a display to be used to display content. The user may, but is not required to, manually remove the control region from the display.

In general, another aspect of the subject matter described in this specification may be embodied in methods that include the actions of providing a control region for display adjacent to a content region, and determining that the control region has been displayed for a predetermined period of time. The process also includes removing the control region from display in response to determining that the control region has been displayed for the predetermined period of time.

In general, another aspect of the subject matter described in this specification may be embodied in methods that include the actions of displaying a content region, receiving a flinging gesture on the content region, and displaying a control region above or below the content region, in response to receiving the flinging gesture. The actions also include detecting a timer trigger event, and automatically hide the control region based detecting the timer trigger event.

In general, another aspect of the subject matter described in this specification may be embodied in methods that include the action of displaying at least a portion of a content region of a user interface and at least a portion of a control region of the user interface, where the control region is peripheral to the content region. The method also includes determining that the portion of the control region of the user interface has been displayed for a predetermined period of time, then automatically removing the portion of the control region from display.

Other embodiments of these aspects include corresponding systems, apparatus, and computer programs, configured to perform the actions of the methods, encoded on computer storage devices.

These and other embodiments may each optionally include one or more of the following features. For instance, the actions include receiving a user input through the user interface, the portion of a content region and the portion of the control region are simultaneously displayed in response to receiving the user input; the user input is a flinging gesture initiated in the content region of the user interface; automatically removing the portion of the control region from display includes displaying a same or different portion of the content region only; automatically removing the portion of the control region includes scrolling the portion of the control region from display; and/or the actions include receiving a user input through the user interface after removing the portion of the control region from display, then displaying a same or different portion of the control region.

In some instances, determining that the portion of the control region has been displayed for a predetermined period of time includes determining when any portion of the control region has been displayed, then starting a timer, and determining when the timer indicates that the predetermined period of time has elapsed; the control region is disposed adjacent to, and above or below the content region; and/or the actions include determining that a flinging gesture input by the user through the user interface has caused or will cause the user interface to scroll past an edge of the content region, where the portion of a content region and the portion of the control region are simultaneously displayed in response to determining that the flinging gesture has caused or will cause the user interface to scroll past an edge of the content region.

In some instances, the actions include receiving a user input, and determining that the user input will cause only a portion of the control region of the interface to be displayed, where simultaneously displaying at least a portion of a content region of a user interface and at least a portion of a control region of the user interface further includes simultaneously displaying the portion of the content region and all of the control region based on determining that the user input will cause only a portion of the control region to be displayed; the portion of the control region includes at least a portion of a title bar, a menu bar, a tool bar, an address bar, a status bar, and/or a progress bar; and/or the user interface includes a web browser user interface, or an email application user interface.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
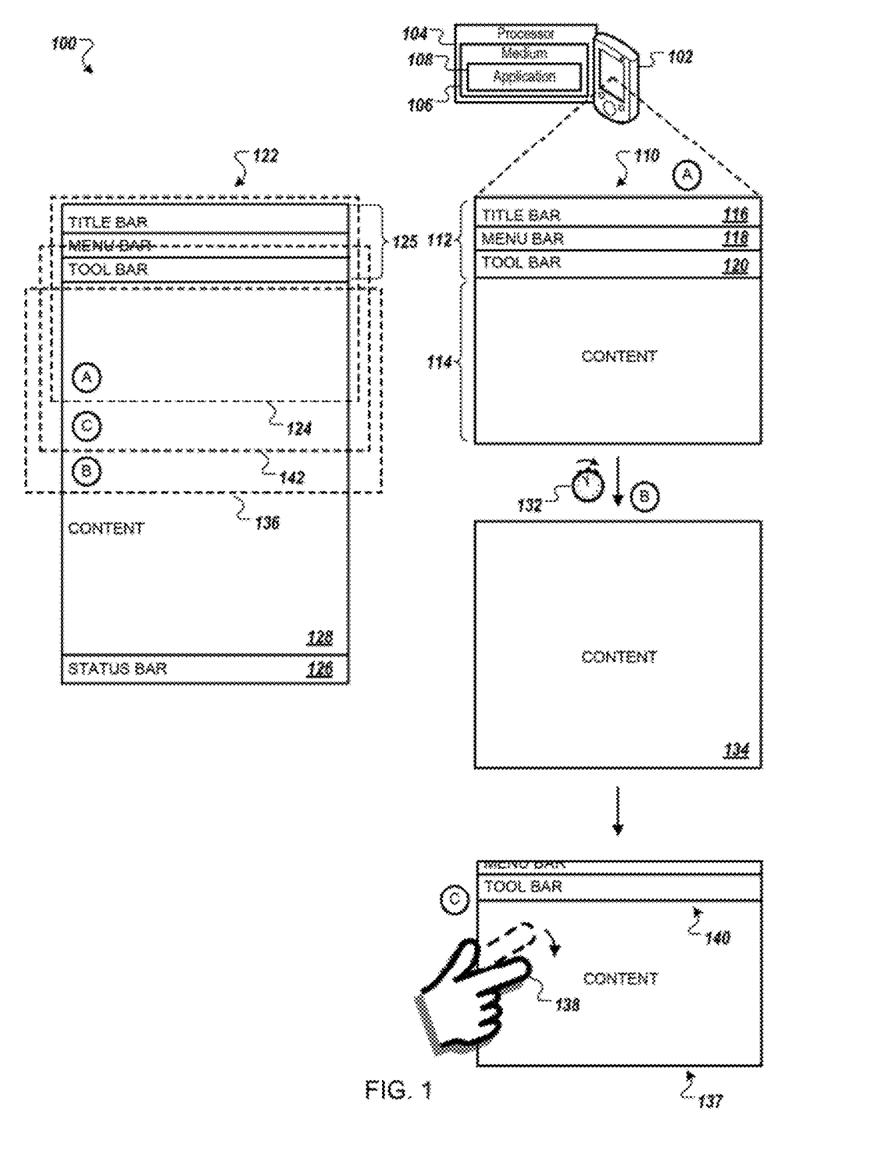
FIGS. 1 and 2 are diagrams of example systems that may be used for displaying user interfaces.

FIG. 1 is a diagram of an example system 100 that may be used for displaying a user interface on a presence-sensitive interface, e.g., a touch-screen display. The system 100 includes a mobile device 102, e.g., a device that includes a processor 104 and a computer readable medium 106. The computer readable medium 106 includes one or more applications 108, such as a web browser.

For mobile device applications that have user interfaces that include both content regions and control regions, an application may briefly display a control region before automatically hiding the control region, for example by scrolling or "snapping" to the outer edge of the content region. Once hidden, the user of the mobile device may drag or scroll the user interface to redisplay the control region. Because the control region is initially displayed to the user, the user is made aware of the controls displayed in the control region. By automatically hiding the control region, however, the user interface is able to display a larger amount of the content region. Such an approach is particularly useful when the user "flings" to, i.e., uses a flinging gesture to access, the top or bottom of content, but overshoots the top or bottom edge of the content region and is shown a control region.

Because the mobile device 102 includes a small display, the web browser may initially display a viewable portion 110 of a user interface 122, where the viewable portion 110 includes a control region 112 and a content region 114. The control region 112 includes a title bar 116, a menu bar 118, and a tool bar 120. The user of the mobile device 102 may drag or scroll the viewable portion 110 of the user interface 122 to see additional portions, or to adjust the viewable portion, of the content region 114.

When the content region 114 is sized to be readable by the user, the entire user interface 122 may be too large to be displayed on the mobile device 102 at any one point in time. The viewable portion 110 of the user interface 122 may thus be a viewport to the user interface 122, where a user's scrolling within the viewable portion 110 of the user interface 122 adjusts the viewport to allow the user see different portions of the user interface 122. The user interface 122 may include, for example, the control region 112 (e.g., as illustrated by a control region 125) and a bottom status bar control region 126. The content region 114 displayed in the viewable portion 110 of the user interface 122 may be a portion of a larger content region 128 included in the user interface 122.

In a state "A", which may correspond to a start-up state of the web browser or a state in which a user has "flung" to the to the top of the user interface 122, the viewable portion 110 of the user interface 122 displays a portion 124 of the user interface 122, where the portion 124 includes a portion of the content region 128 and the control region 125. In some implementations, in state "A", the viewable portion 110 of the user interface 122 includes a control region corresponding to the control region 126 (e.g., a status bar may be displayed at the bottom of the viewable portion 110 of the user interface 122).

By displaying the control region 112 (and possibly a bottom status bar control region 128) the application 108 communicates the existence of the control regions to the user. However, displaying control regions uses space on the viewable portion 110 of the user interface 122 and takes away space that may be otherwise used for displaying content in the content region 114. For example, as shown in the viewable portion 110 of the user interface 122, the control region 112 occupies approximately one third of the viewable portion 110 of the user interface 122. If the control region 112 were not shown on the viewable portion 110 of the user interface 122, a gain of one third of the viewable portion 110 of the user interface 122 for display of content may be achieved. However, as mentioned, if the control region 112 is not displayed, the user may not be made aware that the control region 112 exists.

To achieve balance between a goal of communicating the existence and location of the control region 112 and a goal of increasing space for display of content, the control region 112 may be displayed for a brief, predetermined period of time and then may be removed from the viewable portion 110 of the user interface 122. In other words, the control region 112 may be shown initially and momentarily, so that the user is made aware of the control region 112, and then the control region 112 may be hidden to increase the amount of the content region 114 that is shown on the display.

For example, in a state "B", a predetermined interval (e.g., one second, three seconds, one minute) of a timer 132 may expire and may trigger a timer event. In response to the timer event, the control region 112 may be removed from the viewable portion 110 of the user interface 122, as illustrated by a viewable portion 134 of the user interface 122, without or without an intervening selection or input by the user. A result of removing the control region 112 is that the viewable portion 134 of the user interface 122 includes a larger area for display of content than the viewable portion 110 of the user interface 122. The viewable portion 134 of the user interface 122 is displaying a portion 136 of the user interface 122, where the portion 136 includes the top portion of the content region 128.

In a state "C", the user drags or scrolls the content displayed in the viewable portion 134 of the user interface 122. For example, as illustrated in a viewable portion 137 of the user interface 122, the user may scroll using a finger 138. After scrolling, a portion 142 of the user interface 122 is displayed in the viewable portion 137 of the user interface 122. Scrolling may result in all or a portion of the control region 125 scrolling into view (e.g., as illustrated by a partial control region 140). The user may scroll intentionally, for example, to gain access to the control region 125. The previous showing of the control region 112 (e.g., in the state "A") provided the user with an indication of the location of the control region 125 and also indicated that scrolling may be used to bring the control region 125 back into view.

In some implementations, when scrolling results in some but not all of the control region 125 being scrolled into view, the portion of the control region 125 (e.g., the partial control region 140) remains displayed for a predetermined period time (e.g., five seconds), and then disappears when the predetermined period of time has elapsed. The predetermined period of time for displaying a partial control region may be the same amount or a different amount than the predetermined period of time associated with the timer 132.

In some implementations, if scrolling results in some but not all of the control region 125 being scrolled into view, the entire control region 125 may be shown, or, in other words, may "snap" into view (e.g., as illustrated by the control region 112). After being "snapped" into view, the control region 125 may remain visible until the user scrolls the control region 125 from display. Similarly, if the user scrolls the viewable portion 137 of the user interface 122 so that the entire control region 125 is visible, the control region 125 may remain visible indefinitely (e.g., until the user scrolls the control region 125 from display).

Figure 2:
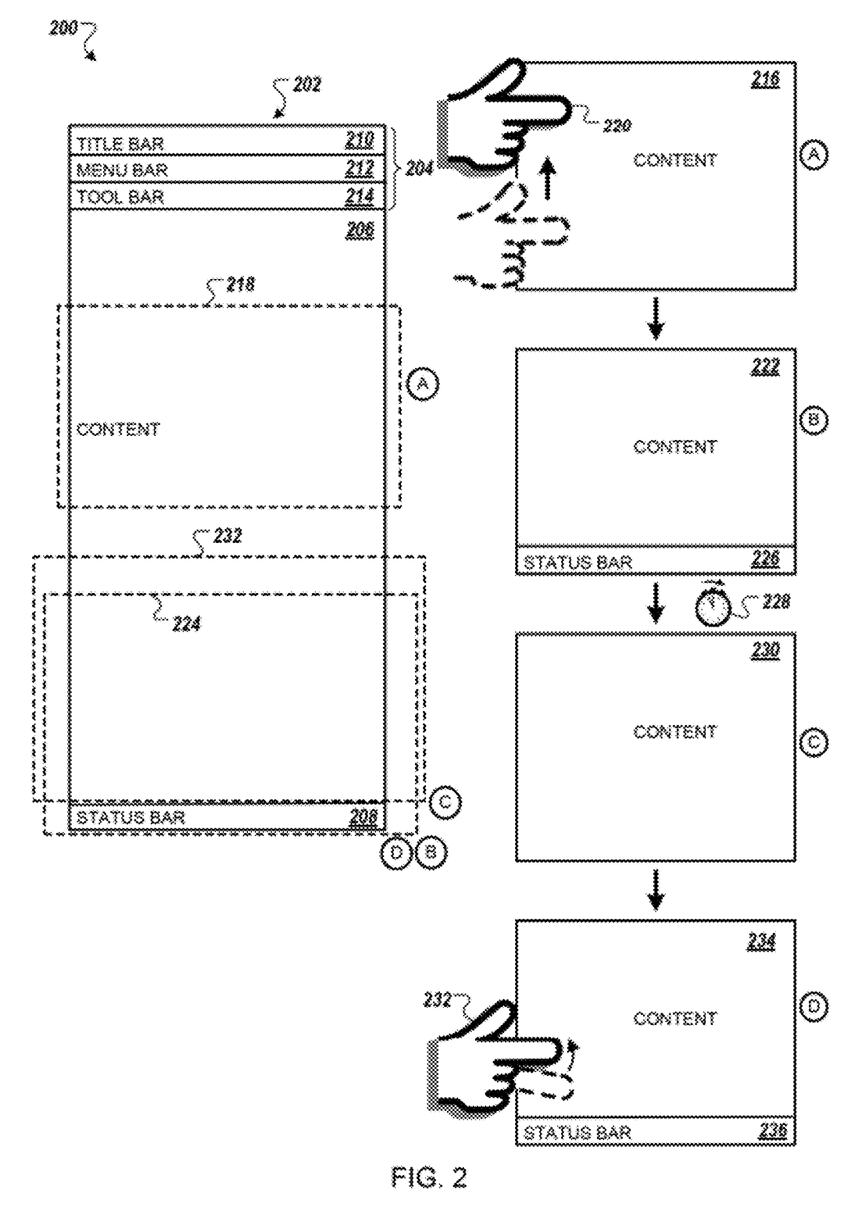

As another example, FIG. 2 is a diagram of an example system 200 that may be used for displaying a user interface 202. The user interface 202 includes a control region 204, a content region 206, and a control region 208. The control region 204 includes a title bar 210, a menu bar 212, and a tool bar 214. A viewable portion of the user interface 202 may be displayed, such as in a user interface of a browser application, on a mobile device.

For example, in a state "A", a viewable portion 216 of the user interface 202 is displayed, showing a portion 218 of the user interface 202. The portion 218 includes a portion of the content region 206. In the state "A", the user scrolls the content displayed in the viewable portion 216 of the user interface 202, such as by using a hand 220. For example, the user may perform a "flinging" gesture, which is a gesture that may be performed with a varying amount of velocity that results in a scroll amount that is proportionate to the velocity.

In a state "B", in response to the flinging gesture, the browser scrolls a viewable portion 222 of the user interface 202 to display, during the scrolling, different portions of the user interface 202. When the scrolling stops, a particular portion of the user interface 202 is displayed in the viewable portion 222 of the user interface 202. For example, if the velocity of the fling is sufficient such that the scrolling reaches the bottom of the user interface 202, a portion 224 of the user interface 202 may be displayed in the viewable portion 222 of the user interface 202. For example, the viewable portion 222 of the user interface 202 includes a control region 226 that corresponds to the control region 208 located at the bottom of the portion 224.

As described above, the showing of the control region 226 in the viewable portion 222 of the user interface 202 facilitates control region discoverability of the user, but uses a portion of the viewable portion 222 of the user interface 202 that may otherwise be used to display content. In a state "C", the control region 226 is removed from the viewable portion 222 of the user interface 202 after a predetermined period of time elapses (e.g., as illustrated by a timer 228). The removal of the control region 226 from the viewable portion 222 of the user interface 202 is illustrated by a viewable portion 230 of the user interface 202. The viewable portion 230 of the user interface 202 is displaying a portion 232 of the user interface 202 (e.g., the bottommost portion of the content region 206). As shown in FIG. 2, the viewable portion 230 of the user interface 202 is capable of displaying a larger amount of content than the viewable portion 222 of the user interface 202.

In a state "D", the user scrolls the viewable portion 230 of the user interface 202 (such as by using a hand 232, as illustrated in a viewable portion 234 of the user interface 202). The user may scroll, for example, to access the control region 208. In response to the scrolling, the control region 208 is displayed (e.g., as illustrated by a control region 236). The control region 236 may be displayed indefinitely, since it may be determined that the user intentionally scrolled to view the control region 236. The control region 236 may be removed from the viewable portion 234 of the user interface 202 if, for example, the user scrolls the control region 236 out of view.

Figure 3:
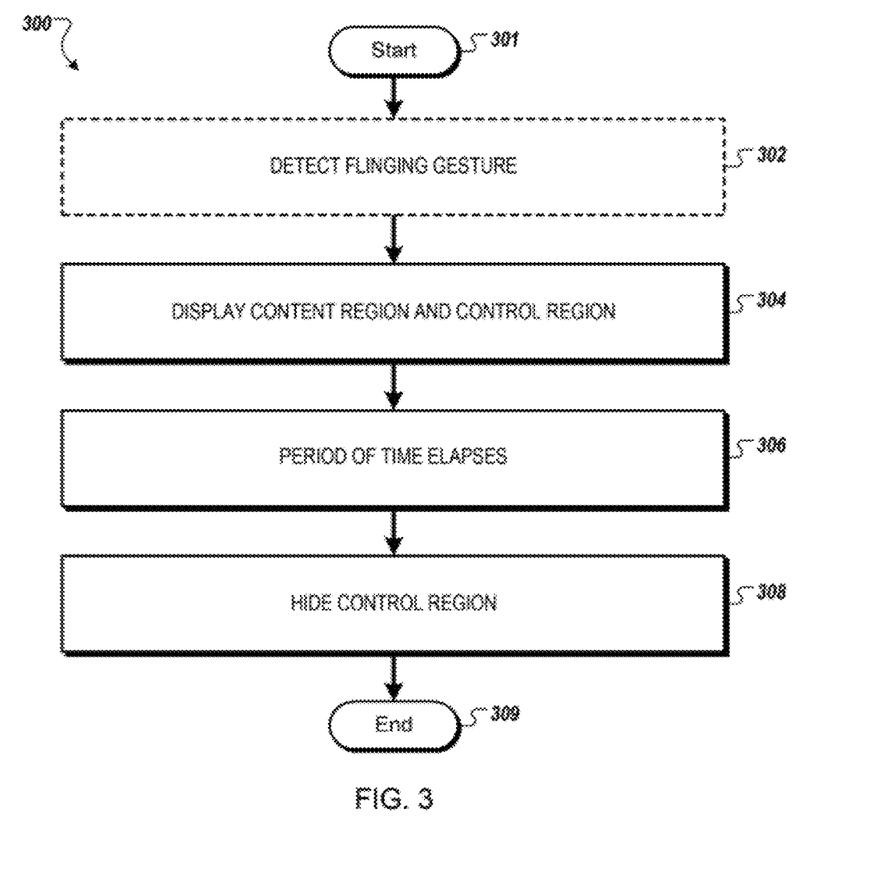
FIG. 3 is a flowchart of an example process for automatically hiding controls.

FIG. 3 is a flowchart of an example process 300 for automatically hiding controls. Briefly, the process 300 includes: (optionally) detecting a user input such as a flinging gesture; simultaneously displaying at least a portion of a content region of a user interface and at least a portion of a control region of the user interface, where the control region is peripheral to the content region. The process 300 also includes determining that the portion of the control region of the user interface has been displayed for a predetermined period of time; and automatically removing the portion of the control region from display.

In further detail, when the process 300 begins (301), a flinging gesture or other user input may be detected (302). As indicated by the dashed outline of the flowchart shape for operation 302, operation 302 is optional. A flinging gesture or other user input may be detected on a user interface, such as the user interface of a mobile device or of another type of device, such as a personal computer. A velocity associated with the flinging gesture may be detected. The velocity may determine an amount of scrolling to perform on the user interface. For example, it may be determined that the flinging gesture input has caused or will cause the user interface to scroll past an edge of a content region included in the user interface.

The content region may be peripheral to one or more control regions. For example, a control region may be at the bottom, at the top, at the left side, or at the right side of the content region. A control region may include one or more of a title bar, a menu bar, a tool bar, an address bar, a status bar, and a progress bar, to name a few examples.

Continuing with FIG. 3, at least a portion of the content region of the user interface and at least a portion of a control region of the user interface are simultaneously displayed (304). The simultaneous display may occur, for example, upon startup of the user interface or in response to a user input (e.g., in response to operation 302). If the simultaneous display occurs in response to user input (e.g., in response to operation 302), the portion of the content region and all or a portion of the control region may be simultaneously displayed based on determining that the user input will cause at least a portion of the control region to be displayed. In other words, the user input may cause the user interface to scroll causing at least a portion of the control region to be displayed. In some implementations, the portion of the content region and all of the control region are simultaneously displayed based on determining that the user input will cause only a portion of the control region to be displayed. In other words, if the user input causes the user interface to scroll such that a portion of the control region is displayed, the entire control region may be displayed, or may "snap" into view.

It is determined that the portion of the control region of the user interface has been displayed for a predetermined period of time (306). For example, a timer may be started when it is determined that any portion of the control region has been displayed and it may be subsequently determined when the timer indicates that the predetermined period of time has elapsed. Alternatively, the time may be started when a user input is received at some point after any portion of the control region has been displayed. For example, a timer event may be received when the predetermined period of time has elapsed. In some implementations, the predetermined period of time is application specific. In some implementations, the predetermined period of time is user configurable.

The portion of the control region is automatically removed from display (308), thereby ending the process 300 (309). All of the control region may be removed from display at the same time, or the control region may be removed by scrolling the control region from display. The control region may be scrolled from display to provide a visual indication to the user, indicating to the user that scrolling the user interface towards the former location of the control region is an action that may cause the control region to reappear.

Removing the control region may result in an increase in the size of the content region, which may result in the display of different content in the content region. For example, if the control region is a title bar located above the content region, removing the title bar from display may result in the display of additional content in the content region. For example, content currently being displayed may move upward in the content region and previously undisplayed content may be displayed at the bottom of the content region.

Figure 4:
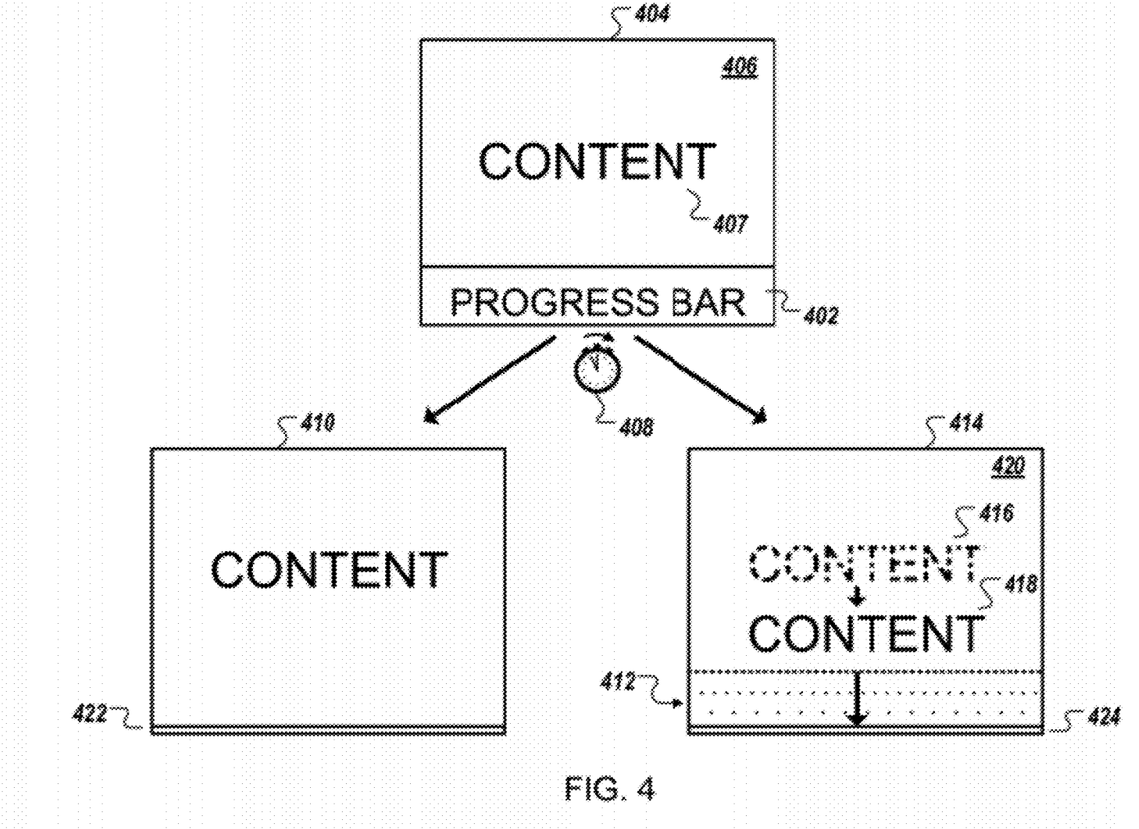
FIG. 4 illustrates the removing of a control region from an example user interface.

FIG. 4 illustrates the removing of a control region 402 from an example user interface 404. The user interface 404 includes the control region 402 and a content region 406. The content region 406 is displaying content 407. The control region 402 may be displayed in the user interface 404, for example, upon startup of the user interface 404. As another example, the control region 402 may be displayed in the user interface 404 in response to a user scrolling to the bottom of the user interface 404.

In response to the display of the control region 402, a timer 408 may be started. The timer 408 may be started based upon the display of the control region, or based on receiving a user input after the control region has been displayed. The timer 408 may be configured such that a timer event fires after a predetermined period of time has elapsed. In response to the timer event, the control region 402 may be removed from the user interface 404. In some implementations, when the control region 402 is removed it may appear to the user that the entire control region 402 is hidden instantaneously. For example, the user interface 404 may appear to change to a user interface 410 instantaneously.

In some implementations, the control region 402 may be removed by scrolling the control region 402 from display. For example and as illustrated in a region 412 of a user interface 414, the control region 402 may appear to scroll or move off of the bottom of the user interface 414. The control region 402 may be scrolled from display to provide a visual indication to the user, indicating that scrolling the user interface 414 towards the former location of the control region 402 is an action that may cause the control region 402 to reappear.

Content may also appear to scroll, or move. Content 416 corresponds to the content 407, and movement of the content 416 to a lower location (as illustrated by content 418) illustrates that content in a content region 420 may move downward in response to the removal of the control region 402. Previously undisplayed content may appear at the top of the content region 420.

In some implementations, an indicator may be displayed to the user that provides a visual indication of the existence of a control region and an indication of an action that may cause the control region to be displayed. For example, the user interfaces 410 and 414 include indicators 422 and 424, respectively, where the indicators 422 and 424 indicate that a control region is located at the bottom of the respective user interface 410 or 414. The indicators 422 and 424 indicate that the user may be able to scroll off the bottom of the user interface 410 or 414, respectively, to cause the control region 402 to be displayed.

Figure 5:
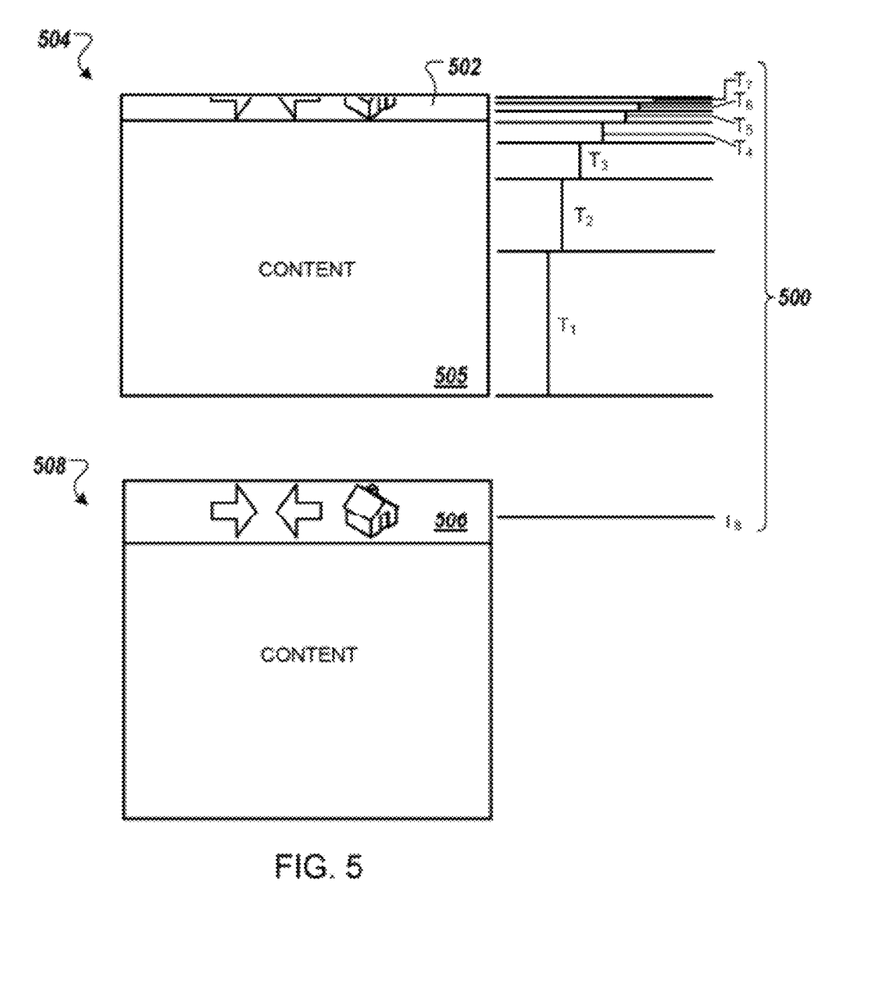
FIG. 5 illustrates the displaying of a control region on an example user interface.

FIG. 5 illustrates the displaying of a control region 502 on an example user interface 504. The user interface 504 includes the control region 502 and a content region 505. The control region 502 is a portion of a larger control region 506 illustrated in a user interface 508. The control region 502 may be displayed in response to a user input, such as a flinging gesture. For example, the user may have performed a flinging gesture to cause the contents of the user interface 504 to scroll so that the control region 502 (e.g., some but not all of the control region 506) is displayed in the user interface 504.

A velocity of the flinging gesture may be detected and the user interface 504 may be scrolled using a simulation of friction, where while the content is being scrolled, larger distances are scrolled in earlier time intervals and smaller distances are scrolled in later time intervals, until the distance scrolled is reduced to zero as the scrolling stops. For example, scrolled distances associated with time points T1, T2, . . . , T7 500 grow progressively smaller. Suppose that the scrolling stops at the time point T7. In some implementations, in response to scrolling stopping while some but not all of the control region 506 has been displayed, the remainder of the control region 506 may automatically be displayed (e.g., the control region 502 may be replaced with the control region 506), such as at a time point T8, as illustrated in the user interface 508.

A number of implementations have been described. Nevertheless, it will be understood that various modifications may be made without departing from the spirit and scope of the disclosure. For example, various forms of the flows shown above may be used, with operations re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, aspects may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Aspects may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular aspects. Certain features that are described in this specification in the context of separate aspects may also be implemented in combination in a single implementation. Conversely, various features that are described in the context of a single aspect may also be implemented in multiple aspects separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A method comprising:
   outputting, by a processor and for display at a proximity-sensitive display coupled to the processor, a content region;
   receiving, by the processor, an indication of a user input received at the proximity-sensitive display, the user input corresponding to a scrolling command;
   responsive to receiving the user input, scrolling the content region a first amount according to the scrolling command;
   responsive to scrolling to an external edge of the content region, continuing scrolling the content region to output, for display, at least a portion of a control region exposed adjacent to the edge of the content region, the control region comprising at least one toolbar with one or more interactive user controls, wherein the interactive user controls are selectable to trigger a function, and
   wherein the at least a portion of the control region is output for display such that a portion of the content region is displaced to accommodate the display of the at least a portion of the control region such that the control region and the content region do not overlap;
   determining, by the processor, that scrolling the content region the first amount according to the scrolling command will result in scrolling past the external edge of the content region to output, for display, of a portion of the control region less than an entirety of the control region; and
   responsive to the determining, and after scrolling the content region the first amount, snapping the control region into position adjacent to the edge of the content region to output, for display, the entirety of the control region, wherein a portion of the content region is displaced to accommodate the display of the entirety of the control region such that the control region and the content region do not overlap; and responsive to determining a predetermined amount time has elapsed, automatically stopping the output, for display, of the control region, and reversing the displacement of the portion of the content region.

2. The method of claim 1, wherein the user input comprises a flinging gesture.

3. The method of claim 1, wherein displaying the portion of the control region comprises animating the portion of the control region to slide into view from an edge of the proximity-sensitive display.

4. The method of claim 1, wherein the user input is received at an area of the proximity-sensitive display that is associated with the content region.

5. The method of claim 1, wherein the content region comprises a web browser window.

6. A system comprising:
   at least one processor operatively coupled to a proximity-sensitive display;
   at least one memory operatively coupled to the at least one processor and configured for storing data and instructions that, when executed by the at least one processor, cause the system to perform a method comprising:
   outputting, by the at least one processor and for display at the proximity-sensitive display, a content region;
   receiving, by the at least one processor, an indication of a user input received at the proximity-sensitive display, the user input corresponding to a scrolling command;
   responsive to receiving the user input, scrolling the content region a first amount according to the scrolling command;
   responsive to scrolling to an external edge of the content region, continuing scrolling the content region to output, for display, at least a portion of a control region exposed adjacent to the edge of the content region, the control region comprising at least one toolbar with one or more interactive user controls, wherein the interactive user controls are selectable to trigger a function, and
   wherein the at least a portion of the control region is output for display such that a portion of the content region is displaced to accommodate the display of the at least a portion of the control region such that the control region and the content region do not overlap;
   determining, by the at least one processor, that scrolling the content region the first amount according to the scrolling command will result in scrolling past the external edge of the content region to output, for display, of a portion of the control region less than an entirety of the control region; and
   responsive to the determining, and after scrolling the content region the first amount, snapping the control region into position adjacent to the edge of the content region to output, for display, the entirety of the control region,
   wherein a portion of the content region is displaced to accommodate the display of the entirety of the control region such that the control region and the content region do not overlap; and
   responsive to determining a predetermined amount time has elapsed, automatically stopping the output, for display, of the control region, and reversing the displacement of the portion of the content region.

7. The system of claim 6, wherein the user input is received at an area of the proximity-sensitive display that is associated with the content region.

8. The system of claim 6, wherein the content region comprises an email message window.

9. A non-transitory computer-readable medium that stores instructions that, when executed by at least one processor in a system, cause the at least one processor to perform a method comprising:
   outputting, by the at least one processor and for display at a proximity-sensitive display coupled to the at least one processor, a content region;
   receiving, by the at least one processor, an indication of a user input received at the proximity-sensitive display, the user input corresponding to a scrolling command;
   responsive to receiving the user input, scrolling the content region a first amount according to the scrolling command;
   responsive to scrolling to an external edge of the content region, continuing scrolling the content region to output, for display, at least a portion of a control region exposed adjacent to the edge of the content region, the control region comprising at least one toolbar with one or more interactive user controls, wherein the interactive user controls are selectable to trigger a function, and
   wherein the at least a portion of the control region is output for display such that a portion of the content region is displaced to accommodate the display of the at least a portion of the control region such that the control region and the content region do not overlap;
   determining, by the at least one processor, that scrolling the content region the first amount according to the scrolling command will result in scrolling past the external edge of the content region to output, for display, of a portion of the control region less than an entirety of the control region; and
   responsive to the determining, and after scrolling the content region the first amount, snapping the control region into position adjacent to the edge of the content region to output, for display, the entirety of the control region,
   wherein a portion of the content region is displaced to accommodate the display of the entirety of the control region such that the control region and the content region do not overlap; and
   responsive to determining a predetermined amount time has elapsed, automatically stopping the output, for display, of the control region, and reversing the displacement of the portion of the content region.

10. The non-transitory computer-readable medium of claim 9, wherein the user input comprises a flinging gesture.

11. The non-transitory computer-readable medium of claim 9, wherein the user input is received at an area of the proximity-sensitive display that is associated with the content region.

* * * * *